US011361259B2

United States Patent
Quadra et al.

(10) Patent No.: US 11,361,259 B2
(45) Date of Patent: Jun. 14, 2022

(54) SUPPLIER SELECTION

(71) Applicant: HEWLETT-PACKARD DEVELOPMENT COMPANY, L.P., Spring, TX (US)

(72) Inventors: Alexandre Da Silva Quadra, Porto Alegre (BR); Augusto Queiroz de Macedo, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 138 days.

(21) Appl. No.: 16/481,800

(22) PCT Filed: Nov. 17, 2017

(86) PCT No.: PCT/US2017/062322
§ 371 (c)(1),
(2) Date: Jul. 29, 2019

(87) PCT Pub. No.: WO2019/099027
PCT Pub. Date: May 23, 2019

(65) Prior Publication Data
US 2020/0272960 A1  Aug. 27, 2020

(51) Int. Cl.
*G06Q 10/06* (2012.01)
*G06F 11/00* (2006.01)
*G06F 11/34* (2006.01)

(52) U.S. Cl.
CPC ....... *G06Q 10/0631* (2013.01); *G06F 11/008* (2013.01); *G06F 11/3409* (2013.01)

(58) Field of Classification Search
CPC ......... G06Q 10/0631; G06Q 10/06395; G06Q 10/20; G06F 11/008; G06F 11/3409; G06F 2201/81
See application file for complete search history.

(56) References Cited

U.S. PATENT DOCUMENTS

| 6,697,962 B1 * | 2/2004 | McCrory ............ G06F 11/0748 714/27 |
| 7,284,204 B2 | 10/2007 | Lee |
| 8,316,263 B1 * | 11/2012 | Gough .................. G06N 3/086 714/47.3 |
| 2002/0194320 A1 | 12/2002 | Collins et al. |
| 2003/0069774 A1 | 4/2003 | Hoffman et al. |
| 2003/0069781 A1 | 4/2003 | Hancock et al. |

(Continued)

OTHER PUBLICATIONS

Electronic Component Sourcing: Supplier and Component Selection Guide (part-4), Feb. 16, 2017, http://www.eeherald.com/section/sourcing-database/component_sourcing_guide4.html.

*Primary Examiner* — Michael A Keller
(74) *Attorney, Agent, or Firm* — Brooks Cameron & Huebsch PLLC

(57) ABSTRACT

A system may comprise a database to collect telemetry data corresponding to a particular component of a device. The system may further comprise a controller coupled to the database. The controller may receive telemetry data for the particular component from the database. The controller may further determine a plurality of metrics for the particular component based on the telemetry data, wherein the plurality of metrics is determined for a plurality of suppliers and select a particular supplier of the plurality of suppliers based on the determined plurality of metrics.

14 Claims, 3 Drawing Sheets

(56) References Cited

U.S. PATENT DOCUMENTS

| | | |
|---|---|---|
| 2004/0205287 A1 | 10/2004 | Joder et al. |
| 2010/0023373 A1 | 1/2010 | Behera et al. |
| 2011/0184927 A1* | 7/2011 | Dalton ................ G06Q 10/087 |
| | | 707/706 |
| 2013/0031424 A1* | 1/2013 | Srivastava ............ G06F 11/079 |
| | | 714/47.2 |
| 2013/0138419 A1 | 5/2013 | Lopez et al. |
| 2016/0255342 A1 | 9/2016 | Blair et al. |
| 2017/0004433 A1* | 1/2017 | Raghavan ........... H04L 41/5006 |
| 2017/0161658 A1 | 6/2017 | Burkart et al. |
| 2017/0235622 A1 | 8/2017 | Boyapalle et al. |

* cited by examiner

SUPPLIER SELECTION

BACKGROUND

Components within a system or a product may experience wear or failure, which may affect performance of the system. When a component experiences wear or failure, a replacement component may be installed within the system. The replacement component may be sourced from a particular supplier of the particular component.

DETAILED DESCRIPTION

Figure 1:
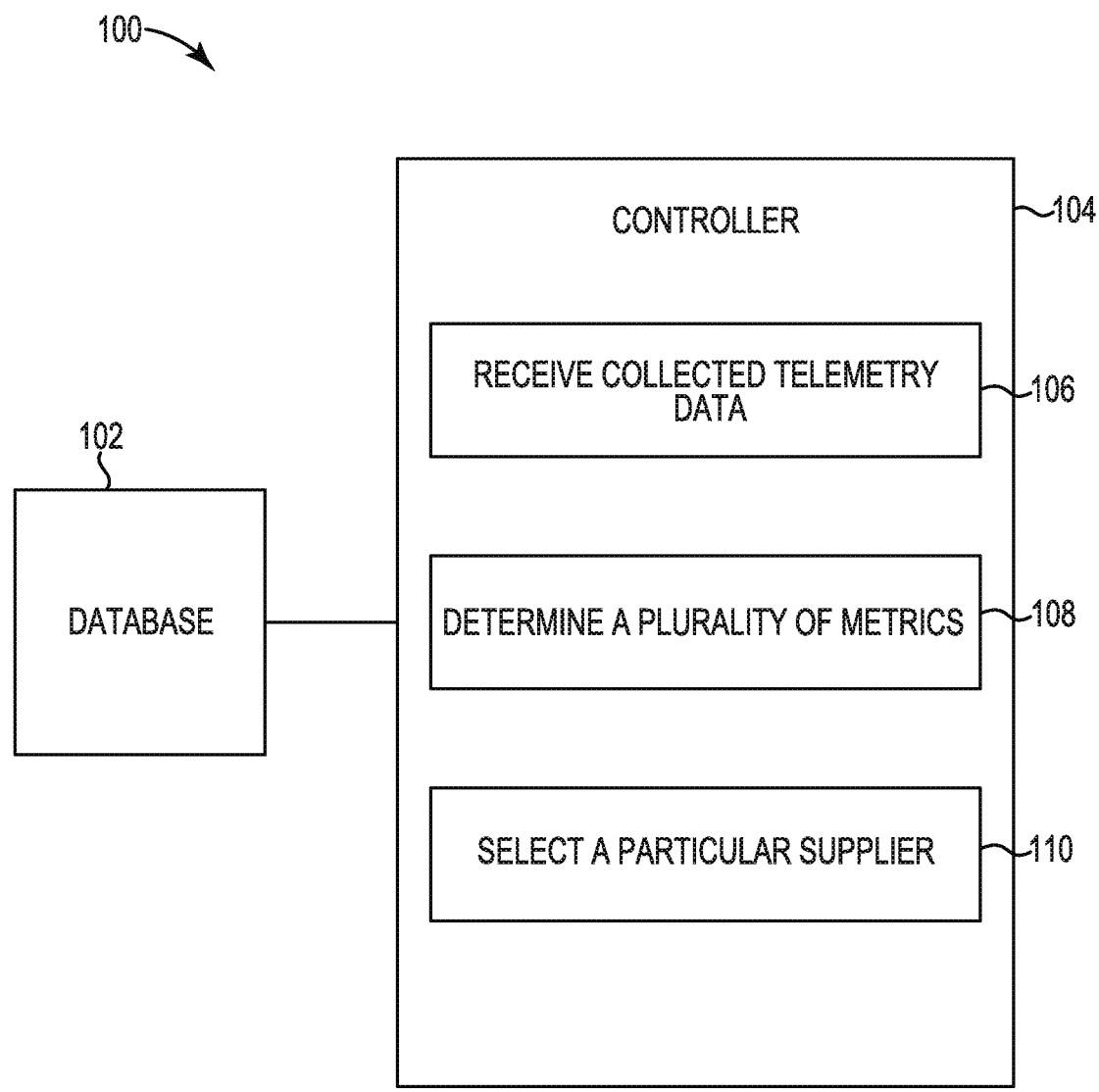
FIG. 1 is an example system for supplier selection consistent with the present disclosure.

Systems and products may include a plurality of components. As used herein, a component refers to a part within a particular system. A component may be a tangible item, such as a hard drive or a battery, although examples are not so limited. A particular component for a system may be provided by a supplier, or may be provided by a plurality of suppliers.

While in use, a particular component may experience wear, which may affect the performance and ability of the component within the system. A particular component may, in some examples, be monitored by a sensor within the system. The sensor may monitor the component to determine a level of performance of the component. If the level of performance of the component falls below a threshold level of performance, for example, the sensor may transmit a notification to the system that the particular component should be replaced.

Upon receipt of a notification that a particular component is to be replaced, a user (e.g., a supply chain technician) may begin a process of selecting a supplier for the replacement particular component. In some examples, the particular component may be supplied by a single supplier; in such examples, the single supplier may be selected to provide the replacement component. In some examples, however, more than one supplier may supply the particular component. Therefore, a user may wish to select a particular supplier to supply the replacement component.

In some examples, selecting a supplier may happen at a time other than when a particular component is to be replaced. For instance, a component may be in stock. Supplier selection can be used to select a next supplier for partnering. For instance, a supply chain technician can compare suppliers to a particular component and select a supplier for partnering in a new product.

In examples where multiple suppliers are able to provide the particular component, a user may wish to compare the suppliers. While each supplier may provide the same component, each supplier's component may differ from the component of another supplier. For example, two suppliers may provide a particular component; however, the component provided by the first supplier may exhibit a particular rate and/or pattern of degradation over time than the component provided by the second supplier. Thus, while the components themselves may be interchangeable in terms of function (i.e. each supplier's component may perform the same particular task), the performance of the component may differ between suppliers.

One way to compare suppliers of a particular component is to compare information about, for example, component performance and failure. In some examples, a supplier may supply a sample of a particular component. The sample component may undergo testing to determine specifications for the component. For example, a sample component may be tested to determine how the component performs over time, the point at which the component fails, and the amount of time a component may be used within a system. Upon completion of the testing of the sample component, the results may be put into a database. A user may then access the results of the testing for each sample component and may use the sample component test results to compare suppliers of the particular component.

However, while testing sample components may produce information about each of the sample components, sample components may not be tested within the system into which the component is intended to be used. For example, a sample component may be tested within a laboratory or within the system itself but under controlled conditions. Therefore, data regarding sample components may not accurately reflect the performance of the component within the system as the system is used on a regular basis. As a result, a particular supplier selected based on the data from the sample data may not be a best fit for the component as the component is used within the system.

Supplier selection according to the present disclosure, by contrast, may utilize data corresponding to particular components collected from the system in which the component is used. Data may be collected and compiled in a database. The data corresponding to a particular component may subsequently be retrieved and metrics may be computed based on the collected and retrieved data. Based on a comparison of the metrics between suppliers of the particular components, a particular supplier for the replacement component may be selected.

By using data collected from the system in which the component is operating, the component, and thus the supplier, may be evaluated based on the performance of the component in the system itself, as opposed to the performance of the component in a controlled test situation. As a result, particular characteristics of the system in which the component is operating may be taken into account when determining a supplier to provide a replacement component. For example, a system may include a battery and use the battery for a greater period of time per day than the time per day a sample battery was tested for. Therefore, the battery in the system may perform differently than the sample battery, and exhibit different degradation patterns than the sample battery. Thus, when selecting a supplier for a replacement battery, a user (e.g., engineer designer, supply chain engineers, etc.) may wish to account for the battery's use within the actual system. Put another way, when the engineers want to select the supplier for the next PC generation they may wish to account for the battery's use within the actual system. In some examples, a supplier selection can be used for part replacement and previously discussed herein, as well as for designing future and/or new products.

FIG. 1 is an example system 100 for supplier selection consistent with the present disclosure. System 100 may include database 102. As used herein, a database may refer to a set of information stored in an organized structure. In some examples, the information may be organized and stored so as to be accessible by a user of the information. Database 102 may collect telemetry data corresponding to a particular component of a device. As used herein, telemetry data may refer to information collected from a system and transmitted to a receiver external to the system. Telemetry data may include, for example, information about performance of the component, as well as information about the environment in which the component is operating, such as temperature. Examples are not so limited, however, and telemetry data may include any information collected corresponding to the particular component and the system in which the particular component is operating.

Database 102 may collect telemetry data corresponding to a particularly component of a device. In some examples, the particular component may include a sensor. The sensor may include a transmitter to transmit information to the database 102. Upon receipt of the information from the device regarding the particular component, database 102 may aggregate and/or organize the collected data. For example, database 102 may separate collected data based on the component to which the data corresponds, the type of data collected, or the supplier of the component. Examples are not so limited, however, and the telemetry data may be organized by database 102 in additional ways.

In some examples, database 102 may further receive a failure notification for the particular component. The failure notification may be transmitted by the particular component to database 102, or, in some examples, the failure notification may be transmitted by a sensor monitoring the particular component. The failure notification may be transmitted to database 102 in response to a determination that the particular component has crossed a failure threshold. As used herein, a threshold refers to a magnitude or level that, when met or exceeded, causes a particular action. A failure threshold, therefore, refers to a level or magnitude that, when reached by a component, may indicate that the component has failed or is approaching failure. As used herein, failure refers to a component ceasing to function. Thus, when a failure notification is transmitted to database 102, database 102 may receive a notification that the particular component has failed or is approaching failure because the particular component has crossed the failure threshold.

System 100 may further include a controller 104. As used herein, a controller refers to an interface between two devices. In some examples, a controller may be an interface between a system and a database, such as database 102, although examples are not so limited. Controller 104 may be coupled to database 102. As used herein, coupling refers to a connection between two devices such that information may be transmitted between the two devices. The information may be transmitted via a wired connection or by a wireless connection.

At 106, controller 104 may receive collected telemetry data for the particular component. The telemetry data received by controller 104 may be the telemetry data collected by database 102. Controller 104 may receive the collected telemetry data at 106 for a particular component of the device. In some examples, the received telemetry data may include information corresponding to a failure of the particular component. The received telemetry data may further include information corresponding to the performance and health of the particular component, as well as the performance and health of the system. Examples are not so limited, however, and additional telemetry data may be received by controller 104 at 106.

At 108, controller 104 may determine a plurality of metrics for the particular component. As used herein, a metric refers to a measurement of a particular standard. Controller 104 may determine the plurality of metrics based on the telemetry data received at 106. In some examples, a metric may be determined based on particular telemetry data received at 106. For instance, telemetry data corresponding to performance of the particular component may be utilized to determine a value for a performance metric for the particular component. Examples are not so limited, however, and other metrics may be determined based on other telemetry data.

In some examples, a plurality of metrics may be determined for a plurality of suppliers. As described previously, the particular component may be sourced from a plurality of suppliers; that is, a plurality of suppliers may provide a particular component. Upon a determination of the suppliers for the particular component, a plurality of metrics may be determined for the particular component. In some examples, each supplier of the plurality of suppliers may have a set of the plurality of metrics computed. Said differently, a plurality of metrics may be determined for each supplier of the plurality of suppliers. As a result, multiple sets of metrics may be determined for the particular component, with each set of the metrics corresponding to a particular supplier of the particular component.

In some examples, determining a plurality of metrics for the particular component at 108 may include determining a past performance for the particular component. As used herein, performance may refer to the use within the system of the particular component. Performance may include, for example, a rate of degradation of the particular component and/or a level of integration within the system, although examples are not so limited. A past performance for the particular component may be based on telemetry data collected for the particular component. For example, the past performance may be determined based on a past degradation rate of the particular component, although examples are not so limited and other measures may be used to determine past performance.

Past performance may, in some examples, be determined using a combination of information from the collected telemetry data. For example, a particular component such as a hard drive may have its performance determined based on a combination of throughput performance, start-up time, and seek time. The past performance metric may thus be determined based on a combination of the values throughput performance, start-up time, and seek time. In some examples, the past performance metric may be determined based on an average of the three values. In other examples, a particular value (e.g., the value for throughput performance) may be determined to be of greater importance in determining a past performance value. In such examples, the past performance metric may be computed based on the three values; however, the particular value may be given a greater weight in the computation. Examples are not so limited, however, and past performance may be determined based on telemetry data using other combinations of telemetry data.

Determining a plurality of metrics at 108 may further include determining a past performance for each supplier of the plurality of suppliers of the particular component. As described previously, a particular component may have multiple suppliers able to source the particular component. The past performance may be determined for each supplier using, for example, a weighted average or a straight average of values for particular performance information, although examples are not so limited. In some examples, the past performance may be determined for each supplier of the particular component, including a subset of suppliers who do not correspond to the supplier of the particular component located within the device. Said differently, the particular component within the device may be sourced from a particular supplier; however, past performance may be determined for both the particular supplier and the other suppliers of the particular component.

In some examples, determining a plurality of metric at 108 may further include displaying the past performance for the particular component and the past performance for each supplier of the plurality of supplier. The past performances may be displayed as, for example, numerical values, although examples are not so limited and other displays may be used. In some examples, the past performance for the particular component may be displayed alongside or next to the past performance for each supplier of the plurality of suppliers. This may facilitate comparison of the past performance of the particular component within the system with the past performance of the particular component for a particular supplier.

At 110, controller 104 may select a particular supplier of the plurality of suppliers. The particular supplier selected may be selected to provide a replacement for the particular component. In some examples, the particular supplier may be selected based on the plurality of metrics determined at 108. The particular supplier may be selected based, for example, on the performance metric determined at 108, although examples are not so limited. In some instances, the particular supplier may be selected based on a value for each of the plurality of metrics being above or below a particular threshold. For example, a particular supplier may be selected to provide the replacement for the particular component based on a determined performance metric being above a threshold performance metric; however, examples are not so limited.

In some examples, selecting a particular supplier of the plurality of suppliers at 110 may comprise the controller 104 to receive a user input to select the particular supplier. Said differently, controller 104 may select the particular supplier based on a user input. The user input may, in turn, be based on a comparison of the plurality of metrics by the user. For example, the user input may be based on the displayed past performances of the particular component and the suppliers, although examples are not so limited. In such examples, the particular supplier may be selected to correspond with the particular supplier selected by the user as a user input.

Figure 2:
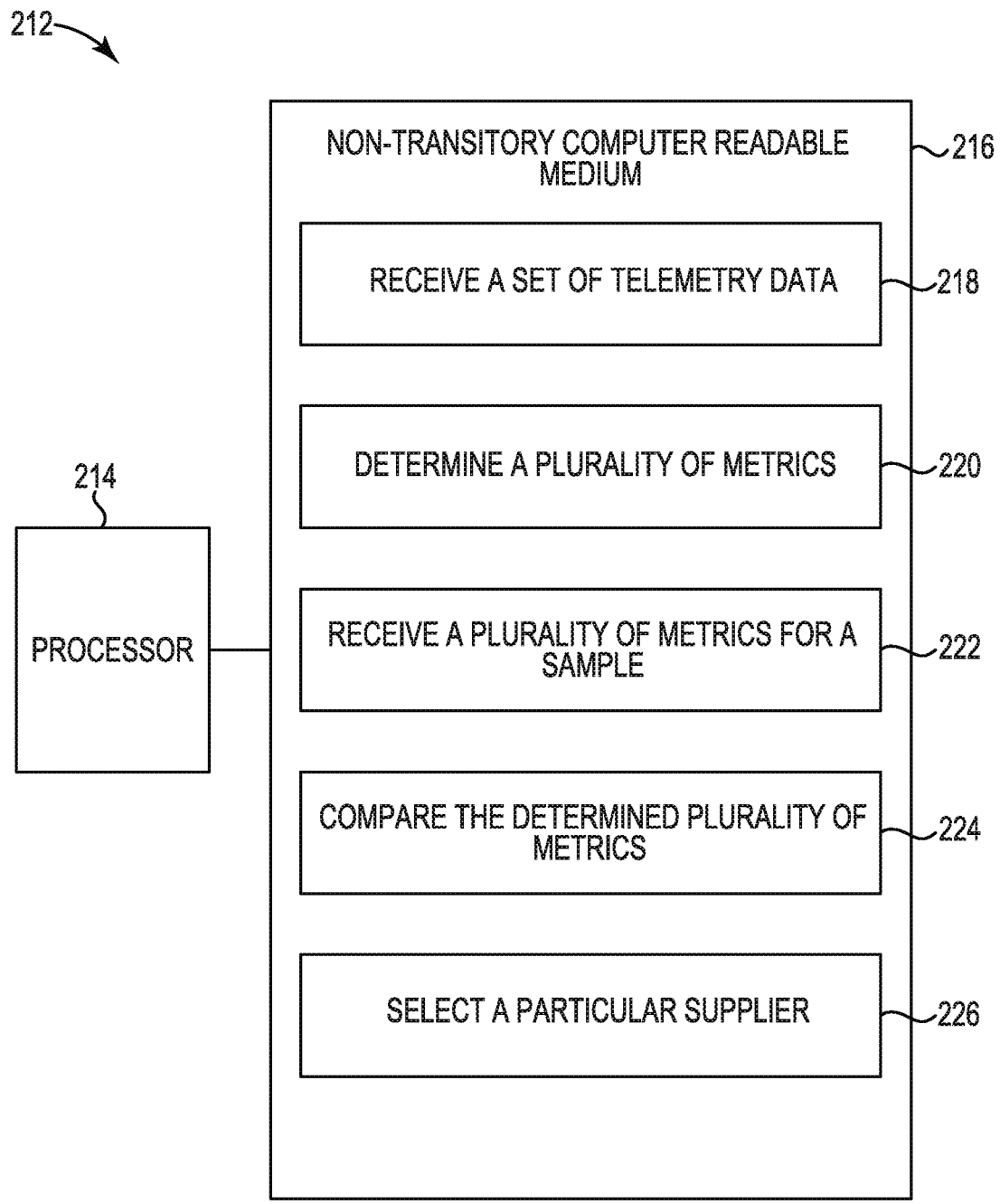
FIG. 2 is another example system for supplier selection consistent with the present disclosure.

FIG. 2 is an example system 212 for supplier selection consistent with the present disclosure. System 212 may include a processor 214. System 212 may further include a non-transitory computer readable medium 216, on which may be stored instructions, such as instructions 218, 220, 222, 224, and 226. Although the following descriptions refer to a single processor and a single memory, the descriptions may also apply to a system with multiple processors and multiple memories. In such examples, the instructions may be distributed (e.g., stored) across multiple non-transitory computer readable mediums and the instructions may be distributed (e.g., executed by) across multiple processors.

Processor 214 may be a central processing unit (CPU), a semiconductor based microprocessor, and/or other hardware devices suitable for retrieval and execution of instructions stored in non-transitory computer readable medium 216. Processor 214 may fetch, decode, and execute instructions 218, 220, 222, 224, 226, or a combination thereof. As an alternative or in addition to retrieving and executing instructions, processor 214 may include at least one electronic circuit that includes electronic components for performing the functionality of instructions 218, 220, 222, 224, 226, or a combination thereof.

Non-transitory computer readable medium 216 may be electronic, magnetic, optical, or other physical storage device that stores executable instructions. Thus non-transitory computer readable medium 216 may be, for example, Random Access Memory (RAM), an Electrically-Erasable Programmable Read-Only Memory (EEPROM), a storage drive, an optical disc, and the like Non-transitory computer readable medium 216 may be disposed within system 212, as shown in FIG. 2. In this example, the executable instructions may be "installed" on the system. Additionally and/or alternatively, non-transitory computer readable medium 216 may be a portable, external or remote storage medium, for example, that allows system 212 to download the instructions from the portable/external/remote storage medium. In this situation, the executable instructions may be part of an "installation package". As described herein, non-transitory computer readable medium 216 may be encoded with executable instructions for supplier selection.

Instructions 218 may include instructions executable by processor 214 to receive a set of telemetry data. The set of telemetry data may be received from a database, such as database 102, described with respect to FIG. 1. In some examples, the set of telemetry data received may be telemetry data corresponding to a particular component of a system. As described with respect to FIG. 1, the telemetry data may include information collected from the system and may include information about the particular component.

Instructions 220, when executed by processor 214, may include instructions to determine a plurality of metrics for the particular component of the system. The plurality of metrics may be determined based on the telemetry data received by instructions 218. In some examples, the instructions to determine a plurality of metrics for the particular component of the system may include instructions to determine a specification failure for the particular component. As described with respect to FIG. 1, a component may transmit a failure notification upon crossing a particular failure threshold. A specification failure metric may consider the point at which the failure notification was crossed. Said differently, a specification failure metric may consider an amount of time passed between installation of the particular component and the transmission of the failure notification. The particular component may include a standard amount of time to pass, or for the component to be in use, prior to the failure notification being transmitted, which may be defined by the supplier of the component. The specification failure metric, therefore, may consider the time at which the failure notification was transmitted by the particular component as compared to the standard amount of time defined by the supplier.

Instructions 220 may further include instructions executable to determine a health grade for the particular component. As used herein, a health grade refers to a measure of the in-use behavior of the particular component. A health grade may be a numerical value representing the behavior of the component; a low numeric value (e.g., 0) may represent a broken or non-functioning component, while a high numeric value (e.g., 100) may represent a component that is behaving according to expectations. In some examples, a health grade may consider degradation of the component. As used herein, degradation refers to wear on the component that may affect the performance and/or abilities of the component. For example, a component that has been in use within a system for a period of time may experience wear affecting its ability to perform its desired function. A standard rate and/or type of degradation for the particular component may be defined; thus, the health grade metric may include comparing the actual degradation of the particular component with the degradation expected for the particular component at the time of comparison. Examples are not so limited, however, and other measures of in-use behavior may be considered in determining a health grade for the particular component.

In some examples, instructions 220 may include instructions executable to determine a performance for the particular component. As described with respect to FIG. 1, performance may refer to the use within the system of the particular component and may include, for instance, degradation of the particular component and/or a level of integration within the system, although examples are not so limited. Instructions 220 may further include instructions to determine a replacement time for the particular component. As used herein, a replacement time refers to the period of time elapsing between a request for a replacement component and receipt of the replacement component. Replacement time may be determined based on past requests for replacement components from particular suppliers. That is, a replacement time may be determined for a supplier and/or for a particular component based on past replacement times for the supplier and/or the particular component.

Instructions 222, when executed by processor 214, may include instructions executable to receive a plurality of metrics for a sample of the particular component. As described previously, a sample of the particular component may be or have been provided for testing by the user of the system in which the component is present. The sample component may be tested and a set of data may be obtained for the sample component based on the tests. As a result, a plurality of metrics may be determined for the sample of the particular component based on the data obtained during testing of the particular component.

In some examples, instructions 222 may include instructions to receive a plurality of metrics for a plurality of samples of the particular component. As described previously, a particular component may be provided by a plurality of suppliers. Thus, instructions 222 may include instructions to receive the plurality of metrics determined based on the testing of a particular sample for each sample of the plurality of samples. Each sample of the plurality of samples may be provided by a different supplier; thus, each set of the plurality of metrics may correspond to a particular sample provided by a particular supplier.

Instructions 224, when executed by processor 214, may include instructions executable to compare the determined plurality of metrics for the particular component with the received plurality of metrics for the sample of the particular components. Instructions 224 may include instructions to compare each metric of the plurality of metrics with a corresponding sample metric. For example, as previously described, a performance metric may be determined for the particular component by instructions 220. A sample performance metric may further be received by instructions 222, where the sample performance metric corresponds to the performance metric for the sample of the particular component. Instructions 224, therefore, may include instructions to compare the performance metric for the particular component determined by instructions 220 with the sample performance metric received by instructions 222. Examples are not so limited, however, and any corresponding metrics may be compared.

In some examples, instructions 224 may include instructions to compare the plurality of determined metrics with the plurality of received metrics for each supplier sample. As previously described, a plurality of metrics may be received for a sample of a particular component from each supplier of the particular component. Instructions 224 may therefore include instructions to compare the plurality of metrics determined for the particular component by instructions 220 with the plurality of received sample metrics for each supplier of the plurality of suppliers. In some examples, the determined plurality of metrics may be compared individually to each of the plurality of metrics for each supplier.

Instructions 226 may include instructions executable by processor 214 to select a particular supplier of the particular component. In some examples, the particular supplier may be selected based on the comparison of the determined plurality of metrics and the received plurality of metrics by instructions 224. For instance, a particular supplier may be selected based on the plurality of metrics for the sample from the particular supplier having a threshold number of matches between corresponding metrics for the determined plurality of metrics. In other examples, a particular supplier may be selected based on the plurality of metrics for the particular supplier being above and/or below a threshold for each of the plurality of metrics. For example, a particular supplier may be selected based on the health grade metric being above a threshold health grade metric and the replacement time metric being below a threshold replacement time metric. However, examples are no so limited, and a particular supplier may be selected based on other comparisons between the determined plurality of metrics and the received plurality of metrics.

Figure 3:
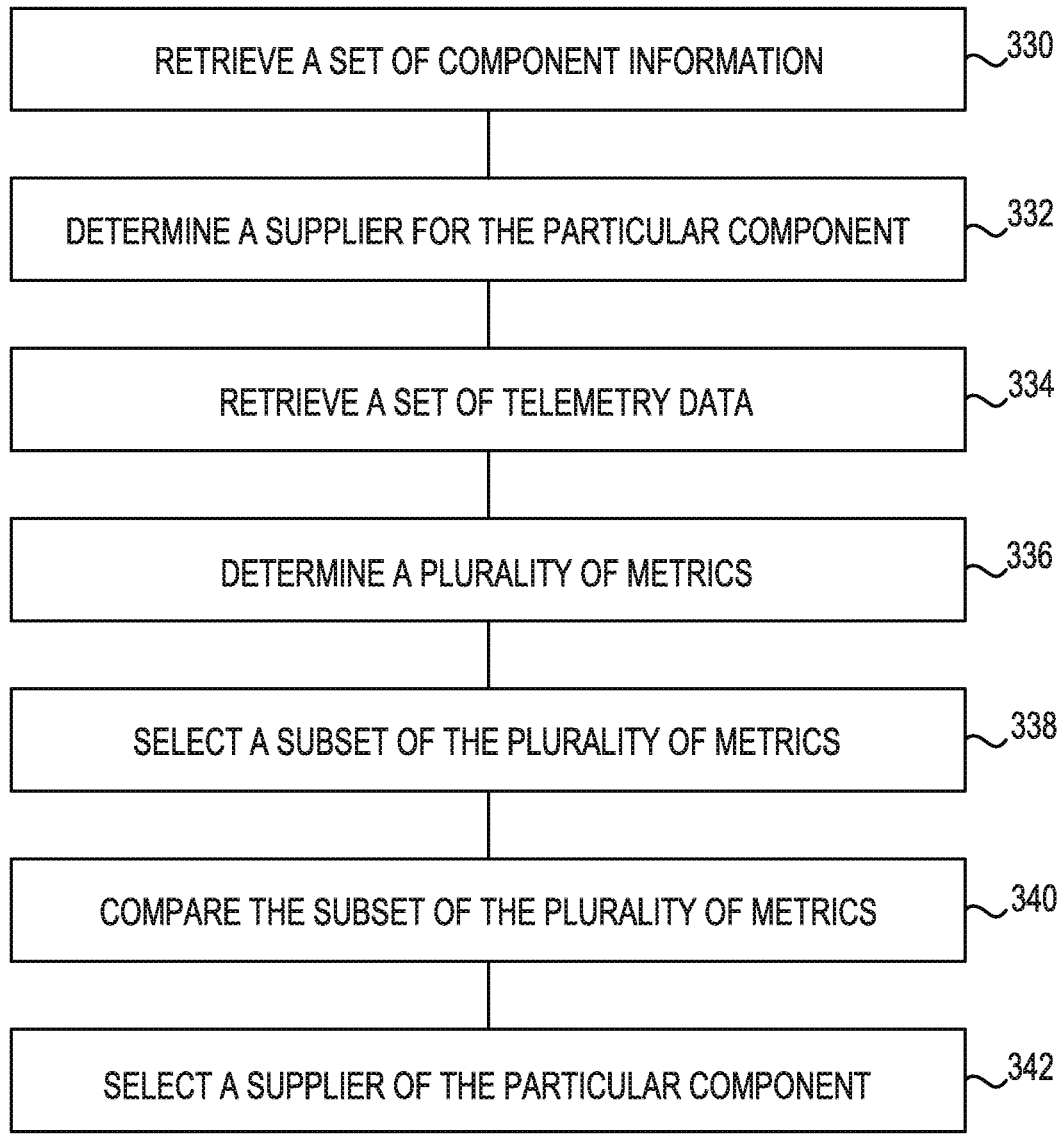
FIG. 3 is an example method for supplier selection consistent with the present disclosure.

FIG. 3 is an example method 328 for supplier selection consistent with the present disclosure. At 330, method 328 may include retrieving a set of component information. The retrieved component information may be retrieved from the component itself, or may be retrieved from a database containing component information. In some examples, the retrieved component information may be component information for a particular component of a system. The retrieved component information may include, for example, a name of the component, an age of the component, a date of manufacture of the component, and/or a manufacturer of the component, although examples are not so limited.

At 332, method 330 may include determining a supplier of the particular component. The supplier of the particular component may be determined based on the component information retrieved at 330. In some examples, the supplier of the particular component may be included within the information retrieved at block 330. That is, information corresponding to the particular component's supplier may be retrieved at block 330 as part of the retrieved component information.

At 334, method 330 may include retrieving a set of telemetry data. The set of telemetry data may be retrieved from a database, such as database 102, described with respect to FIG. 1. In some examples, retrieving a set of telemetry data at 334 may include retrieving a set of telemetry data for the particular component. As previously described, the telemetry data may include information collected from the system in which the particular component is operating.

At 336, method 330 may include determining a plurality of metrics. The plurality of metrics may be determined for the particular component and may be based on the telemetry data retrieved at 334. In some examples, determining a plurality of metrics at 336 may include determining a specification failure for the particular component. Determining a plurality of metrics at 336 may further include determining a health grade for the particular component. As described with respect to FIG. 2, a health grade may measure the in-use behavior of the particular component and may be a numerical indicator of the health of the particular component.

Determining a plurality of metrics at 336 may further include determining a performance value for the particular component. As described with respect to FIGS. 1 and 2, the performance value may refer to the use within the system of the particular component and may account for the actual use and wear of the particular component within the system.

Determining a plurality of metrics at 336 may further include determining a replacement time for the particular component. As described with respect to FIG. 2, a replacement time refers to the period of time elapsing between a request for a replacement component and receipt of the replacement component and may be based on past requests for replacement components from particular suppliers.

At 338, method 328 may include selecting a subset of the plurality of metrics. The subset of the plurality of metrics may be selected based on the component information retrieved at 330. For example, component information retrieved at 330 may indicate that the particular component was received from a particular supplier and further that the particular component is sourced from two suppliers. As a result, a subset of the plurality of metrics may be selected to exclude the replacement time metric, as the replacement time metric may be compared using other methods of comparison.

At 340, method 328 may include comparing the subset of the plurality of metrics. In some examples, the subset of the plurality of metrics may be compared to a corresponding subset of metrics for the determined supplier of the particular component. Said differently, the subset of the plurality of metrics selected at 338 may be compared to corresponding metrics from the supplier of the particular component determined at 332. The corresponding metrics for the supplier of the particular component may be metrics determined based on testing of a sample of the metric, such as testing described with respect to FIG. 2.

In some examples, comparing the subset of the plurality of metrics at 340 may include comparing the subset of the plurality of metrics with a corresponding set of metrics for a plurality of suppliers of the particular component. As described previously, a plurality of suppliers may supply a particular component thus, each supplier of the plurality of suppliers may have a corresponding plurality of metrics for its particular component. Comparing the subset of the plurality of metrics at 340 may thus include comparing the subset of the plurality of metrics determined at 338 with corresponding metrics for each supplier of the plurality of suppliers. In some examples, comparing the subset of the plurality of metrics may include graphing the plurality of metrics. Moreover, the comparison metrics (i.e., the plurality of metrics from the supplier) may be graphed, such that the plurality of metrics determined at 336 may be graphically compared.

At 342, method 328 may include selecting a supplier of the particular component. In some examples, the particular supplier may be selected based on the comparison of the subset of the plurality of metrics determined at 336 with the corresponding set of supplier metrics at 340. In some examples, a user may select a supplier of the particular component based on the comparison. In other examples, the supplier of the particular component may be selected by a system based on, for example, a determination that the metrics of the particular supplier match the metrics for the particular component.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
   a database to collect telemetry data corresponding to a particular component of a device; and
   a controller coupled to the database to:
     receive collected telemetry data for the particular component from the database;
     determine a plurality of metrics including a performance for the particular component and a replacement time for the particular component based on the telemetry data, wherein the plurality of metrics is determined for a plurality of suppliers; and
     select a particular supplier of the plurality of suppliers based on the determined plurality of metrics.

2. The system of claim 1, wherein the database to collect telemetry data is further to receive a failure notification for the particular component, wherein the failure notification is transmitted by the particular component.

3. The system of claim 2, wherein the failure notification is transmitted by the particular component in response to a determination that the particular component has crossed a failure threshold.

4. The system of claim 1, wherein the controller to determine a plurality of metrics based on the telemetry data further comprises the controller to:
   determine a past performance for the particular component;
   determine a past performance for each supplier of the plurality of suppliers of the particular component; and
   display the past performance for the particular component and the past performance for each supplier of the plurality of suppliers.

5. The system of claim 1, wherein the controller to select a particular supplier of the plurality of suppliers further comprises the controller to receive a user input to select the particular supplier.

6. A non-transitory computer readable medium comprising instructions executable by a processor to:
   receive a set of telemetry data for a particular component of a system;
   determine a plurality of metrics including a performance for the particular component and a replacement time for the particular component based on the received telemetry data;

receive a plurality of metrics for a sample of the particular component;

compare the determined plurality of metrics for the particular component with the received plurality of metrics for the sample of the particular component; and select a particular supplier of the particular component based on the comparison of the determined plurality of metrics and the received plurality of metrics.

7. The non-transitory computer readable medium of claim 6, wherein the instructions to determine a plurality of metrics for the particular component further comprise instructions executable to:

determine a specification failure for the particular component; and determine a health grade for the particular component.

8. The non-transitory computer readable medium of claim 6, wherein the instructions to receive a plurality of metrics for a sample of the particular component further comprise instructions executable to:

receive a plurality of metrics for a plurality of samples of the particular component, wherein each sample of the plurality of samples is from a different supplier.

9. The non-transitory computer readable medium of claim 6, wherein the instructions to compare the determined plurality of metrics for the particular component with the received plurality of metrics for the sample of the particular component include instructions executable to:

compare each metric of the plurality of metrics with a corresponding sample metric; and compare the plurality of determined metrics with the plurality of received metrics for each supplier sample.

10. A method, comprising:

retrieving a set of component information corresponding to a particular component of a system;

determining a supplier of the particular component based on the retrieved component information retrieving a set of telemetry data corresponding to the particular component;

determining a plurality of metrics including a specification failure for the particular component and a health grade for the particular component based on the retrieved set of telemetry data;

selecting a subset of the plurality of metrics;

comparing the subset of the plurality of metrics with a corresponding set of metrics for the determined supplier of the particular component; and selecting a supplier of the particular component based on the comparison of the subset of the plurality of metrics with the corresponding set of metrics.

11. The method of claim 10, wherein determining a plurality of metrics for the particular component further comprises:

determining a performance value; and determining a replacement time.

12. The method of claim 10, wherein selecting a subset of the plurality of metrics comprises selecting the subset of the plurality of metrics based on the retrieved component information.

13. The method of claim 10, wherein comparing the subset of the plurality of metrics further comprises graphing the subset of the plurality of metrics.

14. The method of claim 10, wherein comparing the subset of the plurality of metrics with a corresponding set of metrics for the determined supplier of the particular component further comprises:

receiving a plurality of sets of metrics for the particular component, wherein each set of the plurality of sets of metrics corresponds to a particular supplier of the particular component; and comparing each set of the plurality of sets of metrics with the subset of the plurality of metrics for the particular component.

* * * * *